UNITED STATES PATENT OFFICE.

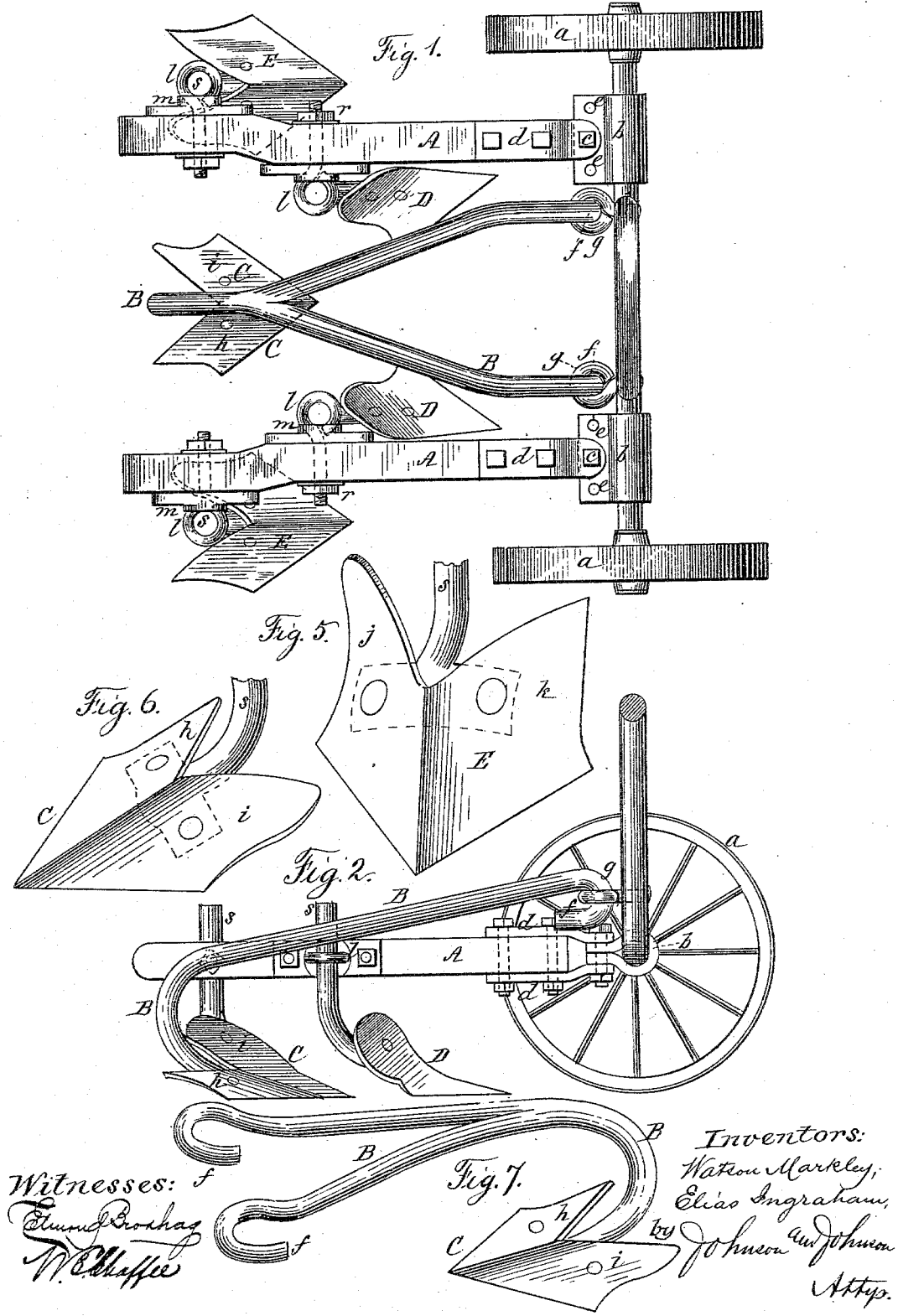

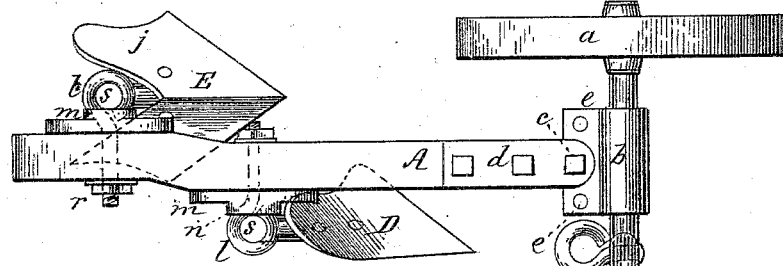

WATSON MARKLEY AND ELIAS INGRAHAM, OF MINNEAPOLIS, KANSAS.

CULTIVATOR-PLOW.

SPECIFICATION forming part of Letters Patent No. 290,593, dated December 18, 1883.

Application filed September 13, 1882. (No model.)

*To all whom it may concern:*

Be it known that we, WATSON MARKLEY and ELIAS INGRAHAM, citizens of the United States, residing at Minneapolis, county of Ottawa, and State of Kansas, have invented new and useful Improvements in Cultivator-Plows, of which the following is a specification.

Our cultivator is adapted for a variety of work in which the plows may be shifted from one beam to another and reversed in positions in such manner as to be used for stirring the ground for sowing small grain, for cultivating corn before and after it comes up, and for plowing up potatoes. For such variety of work we combine with a straddle-axle three pivoted plow-carrying beams, the middle one of which is removably pivoted in such manner as to have only a vertical movement at its free end, while the side beams are adapted for both vertical and lateral movements at their free ends.

Referring to the accompanying drawings, Figure 1 represents a top view of our improved cultivator with three pivoted beams arranged for use in stirring and breaking the soil; Fig. 2, a vertical longitudinal section of the same; Fig. 3, a top view, showing the middle beam removed and the plows arranged as a straddle-row cultivator, with two plows on each side of the row for cultivating small corn, or before the corn comes up; Fig. 4, a similar view, with the plows as in the preceding figure and the middle beam attached for plowing up potatoes. Figs. 5 and 6 show views of the several mold-boards; Fig. 7, the removable middle plow-beam; and Fig. 8 shows views of the clamping device for the plow-standard.

The straddle or yoke axle is supported by wheels $a\,a$, and has sleeves $b\,b$, formed of lapping plates on its horizontal wheel, bearing arms, to which the side beams, A A, are pivoted by bolts $c\,c$ and plates $d\,d$, secured to the ends of the beams. These beams are straight, and carry plows of different forms on their opposite sides, arranged one behind the other, secured in such manner as to be interchangeable. The bearing-sleeves $b$ of the plow-beams are free to turn upon the axle-arms, and the lapping ends of the sleeves have holes $e$, to allow the pivot-bolts of the beams to be changed to set the pivoted ends of the beams nearer to or farther from each other. On these pivot-bolts the beams are free to move laterally and upon their sleeves vertically at their rear ends. Between these beams a third beam, B, is detachably connected to the axle-yoke. This intermediate beam has no lateral movement upon its connections, but is free to rise and fall at its plow-carrying end. It may be of any suitable construction; but the forked and curved standard-beam shown is preferable, as being easily made of iron rods welded together, so as to form the curved standard and the hook ends $f\,f$, by which it is hooked into eyes $g\,g$, riveted into the yoke of the axle, whereby to allow of the easy attachment and detachment of this beam, as may be required for the work. Instead of hooking it into the eyes, as shown, it may be hooked into holes made in the axle-arm sleeves for the purpose. Its hooked connection at two points braces it against lateral movement, by which its use is rendered advantageous with the side-pivoted beams. This intermediate beam has a single mold-board, C, riveted to the foot of its curved standard, having sharp front oblique edges running flat on the ground, with one wing, $h$, straight and pointed, and the other wing, $i$, forming a quarter-pointed mold.

The plows of the side beams are of two kinds, one, D, attached to the inner side of each beam, of single form, and may be used to throw the land to or from the corn, according as they may be placed on the beams, with the mold-boards running on the inside or on the outside. The other plows, E, are formed of two wings running flat on the ground, with oblique sharp edges, one wing, $j$, formed like a half mold-board, and the other wing, $k$, straight and pointed at the front and rear. These plows are all made of cast-steel in one piece and riveted to their standards. The plows of the side beams are attached by eyed bolts $l$ and socket-plates $m$, screwed to the opposite sides of the beam. These plates are formed with face projections $n$, having a horizontal socket or groove, $n'$, and a center hole, through which the bolt $l$ passes horizontally, through the beam, and is clamped by a nut, $r$, with the eye in horizontal position in the groove $n$, so as to bind the plow shank or standards $s$ in the bolt-eye hard against the plate projection, whereby the plows can be set in the proper positions and firmly secured to the beams.

As shown in Fig. 1, the implement is adapted for stirring and leveling the ground, making a shallow plowing for wheat and other small grain with flat running mold-boards, two single plows in front and three winged plows in rear.

For cultivating the corn the last time, the intermediate beam is removed and the side-beam plows will throw the soil to each side of the row of corn and loosen the soil between the rows.

For cultivating small corn, or before it comes up, the front single plows are shifted so that they throw the soil from the row and cut the grass between two rows, as shown in Fig. 3, the intermediate beam not being used.

For plowing up potatoes, the intermediate plow-beam is hooked to the axle, with the front single plows arranged as in Fig. 3, so that they throw the earth from the hills, while the intermediate rear winged plow throws out the hill, and together with the winged plows of the side beams plows up the ground uniformly.

When used for plowing small corn, as in Fig. 3, the mold-boards of the side beams are also shifted so that their curved wings are outside.

The implement can be used as a riding or walking cultivator-plow.

We claim—

1. The straddle or yoke axle having the loose sleeves $b\ b$ and the fixed eyes $g\ g$, the plow-beam A A, pivoted to said sleeves, and the removable intermediate plow-beam, B, having hooked ends $f f$, adapted to hook into and be laterally braced by the axle-eyes $g\ g$, whereby the side plow-beams are free to have both vertical and lateral movements at their plow-carrying ends, and the middle plow-beam is free for vertical movement only at its rear end independent of the side beams, substantially as described, for the purpose specified.

2. The straddle or yoke axle having the fixed eyes $g\ g$ and loose lapping sleeves $b\ b$, having perforations $e$ in their lapped ends, and the laterally-adjustable plow-beams A A, pivoted to said perforated sleeves, with the removable intermediate plow-beam, B, having hooked ends $f f$, adapted to be hooked with and unhooked from the said fixed axle-eyes, substantially as described, for the purpose specified.

In testimony whereof we have hereunto set our hands in the presence of two subscribing witnesses.

WATSON MARKLEY.
ELIAS INGRAHAM.

Witnesses:
A. F. SHEPARD,
E. H. HUTCHINS.